Nov. 14, 1950  F. J. WIEGAND ET AL  2,530,139
POWER CONTROL
Filed Aug. 24, 1946  2 Sheets-Sheet 1

INVENTORS
FRANCIS J. WIEGAND.
LOUIS W. MEADOR.
BY
ATTORNEY

Patented Nov. 14, 1950

2,530,139

UNITED STATES PATENT OFFICE 2,530,139

POWER CONTROL

Francis J. Wiegand and Duis W. Meador, Ridgewood, N. J., assignors to Wright Aeronautical Corporation, a corporation of New York Application August 24, 1946, Serial No. 692,908

27 Claims. (Cl. 123—25)

This invention relates to engine power control systems and is particularly directed to power control systems for aircraft engines.

In the prior art, it is common practice to control the power of an aircraft engine by a regulator responsive to engine air intake manifold pressure for varying the position of the engine throttle in order to maintain the manifold pressure for which the regulator is set. In addition, in the prior art, means—such as a venturi—are generally provided for measuring the mass air flow and for proportioning the fuel flow thereto. However, the manifold pressure itself is a measure of the mass flow of air into an engine per engine intake stroke. Accordingly, it is possible to eliminate the necessity of providing means such as a venturi for measuring the mass air flow and proportioning the fuel flow thereto.

An object of this invention is to provide a novel engine power control system correlating engine air intake manifold pressure and the rate at which the engine consumes fuel, thereby providing a predetermined relation between the rate at which fuel is supplied to the engine and the mass flow of air into the engine. To this end, there is provided a manifold pressure regulator for controlling the position of the engine air throttle valve, together with means for simultaneously controlling the pressure setting of the manifold pressure regulator and the quantity of fuel supplied to each engine cylinder per intake stroke. Preferably, the rate of fuel flow is regulated by controlling the capacity setting of a fuel injection pump or pumps. Specifically, this portion of the power control system comprises a pair of cams connected to a single control lever, the one cam being arranged to control the setting of the manifold pressure regulator and the other cam being arranged to control the rate of fuel flow. With this construction, any desired relation between engine manifold pressure and rate of fuel flow can be provided by the design of the cams.

As the altitude of an engine in an aircraft increases, the air density decreases and therefore it is necessary that the manifold pressure regulator operate to open the engine throttle to maintain the manifold pressure for which the regulator is set. Also, it may be desirable to vary the manifold pressure with altitude—for example, because of the decrease in engine exhaust back pressure with altitude. Thus, in order to maintain the engine power and/or torque constant with variations in altitude, the engine manifold pressure must decrease with altitude. Accordingly, it is a further object of this invention to provide a simple and novel means for automatically adjusting the manifold pressure in order to maintain the engine power constant regardless of the aircraft altitude or in order to maintain any reasonable variation in engine power with altitude. To accomplish this feature, the manifold pressure cam is a three-dimensional cam which is rotated to set the pressure of the manifold pressure regulator and is axially moved by the manifold pressure regulator simultaneously with movement of the engine throttle valve by said regulator. In addition, the arrangement is such that the manifold pressure cam is moved axially by the manifold pressure regulator upon an increase in altitude even though the throttle valve has already reached its full open position. As a result, the axial position of the cam is a function of the aircraft altitude and, therefore, the three-dimensional manifold pressure cam can be contoured axially to provide the desired variation of manifold pressure with altitude. Similarly, the fuel control cam is a three-dimensional cam which rotates and moves axially with the manifold pressure cam for controlling the capacity setting of the fuel injection pump or pumps. As a modification, the invention may also be used with an engine having a carburetor for controlling the fuel-air ratio. With this latter arrangement the fuel cam controls the fuel-air ratio setting of the carburetor.

As the aircraft engine goes up in altitude, the manifold pressure regulator continues to open the engine throttle to maintain the pressure for which the regulator is set. At the critical altitude, the throttle valve is fully open and, in the absence of any supercharging or increased supercharging, upon any further increase in aircraft altitude, the manifold pressure regulator will be unable to maintain the pressure for which the regulator is set. Accordingly, since the fuel cam continues to move axially with increase in altitude above the critical altitude, it can be contoured axially so that the fuel flow is reduced to correspond to the actual engine manifold pressure thereby maintaining the proper fuel-air ratio.

The power control system also includes a third cam movable to directly vary the position of the engine throttle valve, this throttle cam being movable both axially and rotatively with the aforementioned manifold pressure and fuel cams. Accordingly, when the cams are rotated to vary the manifold pressure regime or setting of the engine, the throttle cam may directly effect some change in the position of the engine throttle valve, the final adjustment of the throttle valve being effected by the manifold pressure regulator. In this way, the design of the throttle cam determines the magnitude of the throttle valve movements effected by the manifold pressure regulator and the magnitude of the accompanying axial movements of the cams.

The power output of the engine not only depends on the engine intake manifold pressure (which is substantially proportional to engine torque) but also on the engine R. P. M. or speed. It is a further object of this invention to provide a simple control for engine speed as well as engine torque. To this end, there is provided a fourth cam movable with the aforementioned manifold pressure, fuel and throttle cams. This fourth cam is also a three-dimensional cam and can be contoured to provide any desired variation of engine speed with engine manifold pressure and altitude. With this arrangement, the engine is under the control of a single lever and the power may be maintained constant with changes in altitude or any reasonable variations in power with altitude may be provided. It is also an object of this invention to provide means for overriding the speed control to vary the engine speed from that predetermined by the contour of the R. P. M. cam.

As previously mentioned, as the aircraft altitude increases, the decrease in air density makes it necessary to open the engine throttles more and more in order to obtain the desired engine power and manifold pressure. Accordingly, aircraft engines are commonly provided with variable speed superchargers, either driven directly from the engine through a variable speed transmission or driven by the engine exhaust gases. With this invention, when the engine throttle is fully open and it is no longer possible to obtain the desired manifold pressure because of the low air density, the speed of the supercharger can be increased to provide the desired manifold pressure. It is a further object of this invention to automatically control the speed of the supercharger in order to maintain a predetermined power regime with variations in aircraft altitude. The invention is applicable to engines having multi-speed superchargers with two, three or any number of speed drive ratios.

In a particular engine, the mass flow of air into the engine cylinders per intake stroke not only depends on the intake manifold pressure but also depends on the temperature of the intake air and the exhaust back pressure. Accordingly, it is a further object of this invention to modify the intake manifold pressure with changes in the intake air temperature and/or changes in the exhaust back pressure so that for a particular setting of the manifold pressure regulator, the mass flow of air into the engine will be unaffected by the temperature of the intake air and/or the engine exhaust back pressure. The manifold pressure cam may be contoured axially to at least approximately compensate for average variations of engine intake air temperature and exhaust back pressure with changes in altitude.

In order to increase the power which may be obtained from an internal combustion engine without detonation of the engine, it is common practice to provide means for introducing an anti-detonant—such as water—into the engine induction system at high engine powers. The amount of anti-detonant required to inhibit detonation depends not only on the power output of the engine but also on the temperature of the engine intake air. The temperature of the engine intake air generally decreases with increase in altitude but, when the speed of the supercharger is increased, the temperature of the intake air increases. It is a further object of this invention to provide means for automatically controlling the rate at which the anti-detonant is introduced into the engine so that the rate not only depends on engine power but also depends on aircraft altitude and on the speed of the supercharger. In general, however, the rate at which the anti-detonant is introduced into the engine depends on the magnitude of the engine intake manifold pressure. Specifically, therefore, it is a further object of this invention to control the rate at which an anti-detonant is introduced into the engine by means of a three-dimensional cam which is rotatable with the aforementioned cams for setting the engine power and which is axially movable with changes in aircraft altitude.

A still further object of this invention is to provide a novel and simple engine power control system including a plurality of three-dimensional cams in which each cam is manually movable in one direction to control a particular engine condition associated with engine power and is automatically movable in another direction for varying said condition with engine altitude.

Other objects of the invention will become apparent upon reading the annexed detailed description in connection with the drawing in which.

Figure 1:
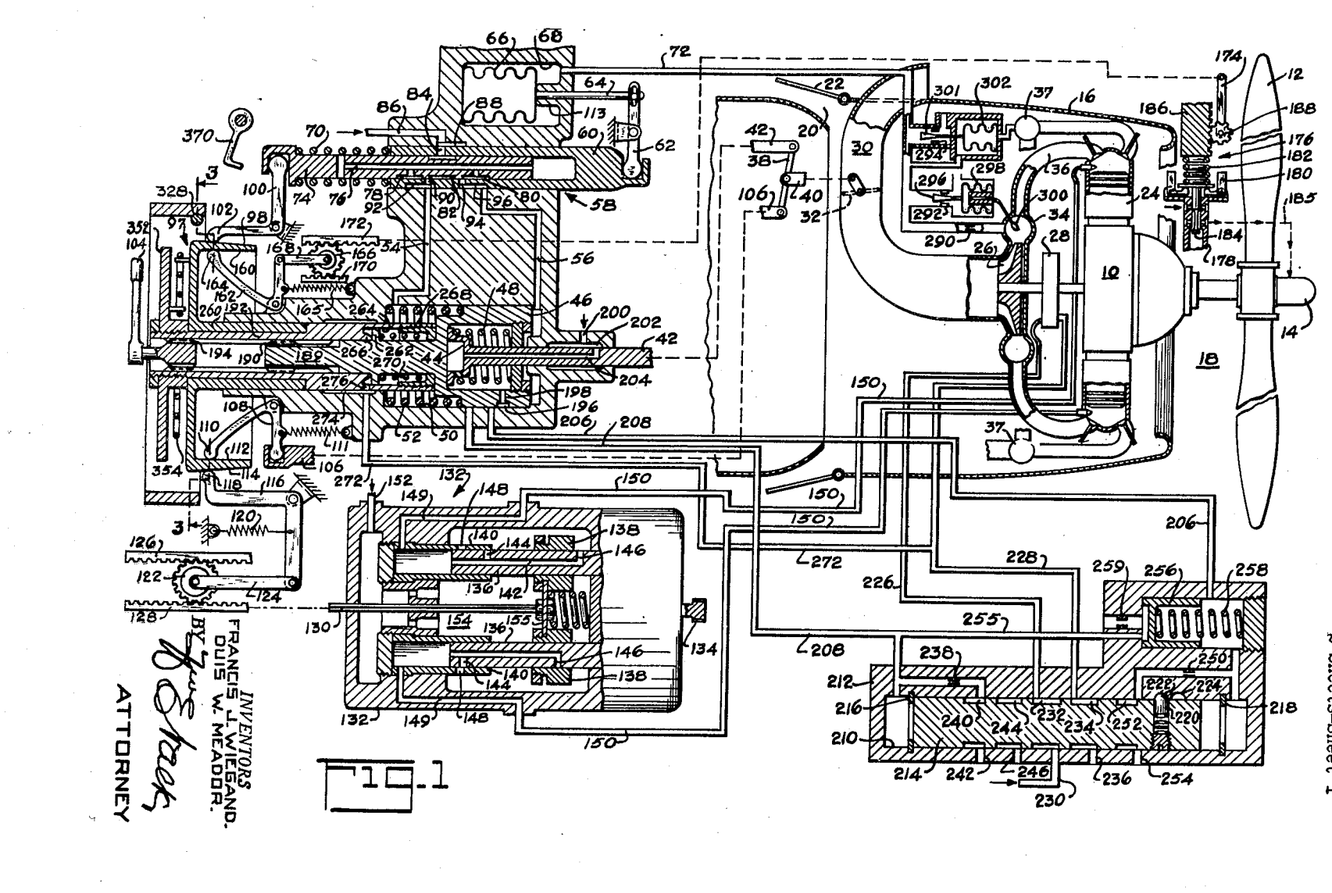
Figure 1 is a schematic sectional view of a control system embodying the invention.

Referring to the drawing, a conventional aircraft engine indicated at 10 is drivably connected to an aircraft propeller 12 having conventional means 14 for adjusting the pitch of the propeller blades. The engine is disposed within a cowl 16 having a forwardly directed entrance opening for the engine cooling air and a rearwardly directed air exit opening 20 controlled by cowl flaps 22. As illustrated, the engine is provided with a plurality of radially disposed cylinders 24 and is drivably connected to a supercharger through a multi-speed transmission 28—for example, such as illustrated in Patent No. 2,101,239 to R. Chilton.

Air for combustion within the engine is taken in through an intake duct 30 under the control of a throttle valve 32. The duct 30 supplies air to the engine driven supercharger 26 which compresses the air into an annular manifold 34 from which it is distributed to the various engine cylinders 24 through intake pipes 36. The engine cylinders exhaust into an annular manifold 37 from which the exhaust gases discharge into the atmosphere.

The throttle valve 32 is connected to a floating lever 38 through a link 40. One end of the floating lever 38 is pivotally connected to an arm 42 having a head end 44 disposed within a piston 46. A spring 48 provides a resilient connection between the piston 46 and the arm 42 urging the arm in a throttle valve opening direction. The piston 46 is slidable within a cylinder 50 and is urged in a throttle valve closing direction by a spring 52.

The two ends of the cylinder 50 are in communication with passages 54 and 56 respectively. A servo-valve unit 58 is arranged to control the admission and relief of fluid pressure in the passages 54 and 56 thereby controlling the position of the piston 46 and the position of the throttle valve 32.

The servo unit 58 comprises a sleeve 60 having a pivotal connection with one end of a lever 62. A push rod 64 is pivotally connected to the other end of the lever 62 and extends into engagement with a sealed bellows 66 disposed within a chamber 68. A spring 70 acts on the sleeve 60 to urge the push rod 64 into engagement with the free end of the bellows 66. The chamber 68 communicates with the engine intake manifold 34 via a conduit 72 whereby the bellows 66 contracts and expands respectively with increase and decrease of engine intake manifold pressure. In this way, the position of the sleeve 60 depends directly on the engine intake manifold pressure.

The servo unit 58 also includes a valve 74 slidable within the sleeve 60. The valve 74 is provided with a central drain passage 76 communicating with spaced external longitudinal grooves 78 and 80. The valve 74 is also provided with an annular groove 82 intermediate the grooves 78 and 80 and communicating with a radial passage 84 extending through the sleeve 60. A suitable fluid under pressure—such as engine lubricating oil—is supplied to the servo unit 58 from a passage 86 and a longitudinal groove 88 communicating with the sleeve passage 84. The sleeve 60 is also provided with a radial passage 90 and a longitudinal groove 92 in communication with the passage 54 and is provided with a radial passage 94 and a longitudinal groove 96 in communication with the passage 54 and is provided with a radial passage 94 and a longitudinal groove 96 in communication with the passage 56.

In the relative position of the servo valve and sleeve illustrated in Figure 1, fluid pressure is admitted from the passage 86 through longitudinal groove 88, passage 84, annulus 82, passages 90 and 54 to one end of the cylinder 50. At the same time, the other end of the cylinder 50 is vented through passage 56, groove 96, passage 94, groove 80 to the drain passage 76. Accordingly, the piston 46 is urged in a throttle valve closing direction.

In the position illustrated in Figure 1, the piston 46 is in its minimum-open throttle valve position. In Figure 1, if the valve 74 is moved to the right relative to the sleeve 60, the passage 90 will be cut off by the valve portion between the groove 78 and the annulus 82 and, at the same time, the passage 94 will be cut off by the valve portion between the groove 80 and the annulus 82. This relative position of the valve 74 and sleeve 60 may be termed their neutral position since, in this position, passages 54 and 56 are both closed whereby the fluid pressure controlled by the servo unit 58 does not tend to move the piston 46.

Further movement of the valve 74 to the right brings the annulus 82 in communication with passage 94, groove 96 and passage 56. At the same time, the passage 54 is vented to the drain passage 76 via passage 90 and groove 78. Accordingly, the pressure transmitted to the cylinder 50 through the passage 56 causes the piston 46 to move to the left to open the throttle valve 32. As the throttle valve 32 opens, the engine intake manifold pressure increases and the bellows 66 contracts thereby effecting movement of sleeve 60 to the right. The piston 46 continues to move to open the throttle valve 32 and increase the engine intake manifold pressure until the sleeve 60 moves to the right to an extent sufficient to again bring the valve 74 and the sleeve 60 to their relative neutral position. Similarly, a movement of the valve 74 to the left from the relative neutral position of the valve 74 and sleeve 60 results in admission of fluid pressure to the passage 54 and relief of pressure in the passage 56 whereupon the piston 46 moves, or tends to move, to the right to effect a closing adjustment of the throttle valve 32 thereby reducing the engine intake manifold pressure.

With this construction of the servo unit 58, each position of the sleeve 60 corresponds to a particular engine intake manifold pressure. Also, any movement of the valve 74 and/or the sleeve 60 from their relative neutral position results in the piston 46 moving the throttle valve 32 to change the intake manifold pressure to the value necessary to move the sleeve 60 to its neutral position relative to the valve 74. Accordingly, the bellows 66, piston 46 and the servo unit 58 comprise an engine intake manifold pressure regulator automatically operative to maintain a manifold pressure corresponding to the position of valve 74. If a higher manifold pressure is desired, the valve 74 is moved to the right to an extent determined by the increase in manifold pressure desired and the manifold pressure regulator automatically positions the throttle valve to maintain the new manifold pressure. Similarly, movement of the throttle valve 74 to the left lowers the manifold pressure to an extent determined by the magnitude of this movement.

As illustrated, the position of the valve 74 is controlled by a cam member 97 having a cam surface 98 through a bell crank lever 100 having one end operatively connected to the valve 74 and having a cam follower portion 102 at its other end engaging the cam 98. The cam surface 98 is herein termed the "manifold pressure" cam. The spring 70 serves to maintain the follower 102 against the cam 98. The cam 98 is profiled so that rotation of the cam in a clockwise direction, as viewed in Figure 2, raises the cam follower 102 and moves the valve 74 to the right to increase the engine intake manifold pressure. Similarly, counterclockwise rotation of the cam 98 results in adjustment of the valve 74 to the left to decrease the engine intake manifold pressure. A control arm 104 is connected to the cam member 97 by means hereinafter described for rotatively positioning the cam 98. In this way, the handle 104 is rotatively movable to determine the engine intake manifold pressure and therefore the engine torque which is substantially proportional to this pressure.

The other end of the floating lever 38 is connected to an arm 106 operatively connected to one end of a bell crank lever 108. The other end of the lever 108 is provided with a cam follower portion 110 engageable with a cam surface 112 formed rigid with the cam surface 98 on the cam member 97. A spring 111 urges the cam follower portion 110 into engagement with the cam surface 112. The cam 112, hereinafter termed the "throttle cam," is designed so that rotation of the handle 104—for example, for increasing the engine intake manifold pressure—results in an adjustment of the position of the engine throttle valve 32 directly through the bell crank lever 108 and arm 106 for approximating the desired manifold pressure. This adjustment of the throttle valve 32 directly from the throttle cam 112 generally varies the magnitude of movement of the piston 46 necessary to bring the throttle valve 32 to its proper setting in order to maintain the manifold pressure for which the valve 74 is set by the handle 104. The purpose of the throttle cam 112 is hereinafter more fully described.

As the aircraft goes up in altitude, the air density decreases and, therefore, the throttle valve 32 must be opened in order to maintain the desired manifold pressure. With the aforedescribed construction, any decrease in manifold pressure—for example, because of a decrease in air density—results in movement of the sleeve 60 to the right (Figure 1) thereby effecting movement of the piston 46 to the left to open the throttle valve 32 and maintain the manifold pressure for which the control handle 104 is set.

The piston 46 is operatively connected to the cam member 97 so that the cams move axially with the piston. With this arrangement, the axial position of the piston 46 and the cams 98 and 112 is a function of the altitude or air density. Therefore, the manifold pressure cam 98 can be contoured axially to effect any desired automatic variation of manifold pressure with altitude. Because of the decrease in the engine exhaust back pressure and decrease in engine intake air temperature with increase in altitude, if the mass flow of air into the engine is to remain constant, the manifold pressure must decrease slightly with increase in altitude. Accordingly, the manifold pressure cam 98 can be contoured axially to decrease the manifold pressure with increase in altitude to compensate for variations of the exhaust back pressure and air intake temperature with altitude.

The manifold pressure cam 98 is designed so that when the power control arm 104 is set for engine idling operation, the manifold pressure cam 98 calls for a manifold pressure which is less than the engine manifold pressure at engine idling operation. Accordingly, the servo unit sleeve 60 is displaced to the right from its neutral position relative to the valve 74 whereupon the piston 46 is urged to the right and held in its extreme right hand position as illustrated in Figure 1. Therefore, in the idle range, the throttle cam 112 alone controls the position of the throttle valve 32 thereby providing for manual control of the throttle valve during engine idling operation.

If the power control arm 104 is suddenly moved from a high power position to a low power position, the engine manifold pressure momentarily drops quite low and may even go below the minimum setting of the manifold pressure cam 98. If so, the manifold pressure regulator would immediately operate to effect an opening adjustment of the engine throttle thereby causing an undesirable engine surge. To avoid this possibility, a stop 113 is provided to prevent the manifold pressure bellows from expanding beyond a condition corresponding to the lowest manifold pessure setting of the cam 98.

The mass flow of air into the engine per intake stroke depends on the engine intake manifold pressure. Also, the rate at which fuel is supplied to the engine is to be proportioned to the mass air flow. Accordingly, the handle 104 can be used to set the fuel flow as well as the desired manifold pressure. To this end, the cam member 97 is provided with a third cam surface 114 formed rigid with the cam surfaces 98 and 110. A bell crank lever 116 has a cam follower end portion 118 urged into engagement with the cam 114 by a spring 120. The other end of the bell crank lever 116 is pivotally connected to a gear 122 by an arm 124. The gear 122 is disposed between a pair of racks 126 and 128. The rack 126 is normally stationary and the rack 128 is connected to a rod 130 comprising the capacity control rod of a conventional fuel injection pump unit 132.

The pump unit 132, as schematically illustrated in Figure 1, comprises an engine driven shaft 134 drivably connected to a plurality of plungers 136 such that rotation of the shaft 134 causes reciprocation of the plungers 136. Each plunger 136 is slidable within a movable sleeve 138 and a co-axial fixed sleeve 140. Also, each plunger is provided with a longitudinal passage 142 opening into the inner end of its sleeve 140 and with a pair of radial passages 144 and 146 opening into the longitudinal passage 142. Each sleeve 140 is provided with a radial passage 148 arranged to register with the plunger passage 146 at the inner end of the stroke of its associated plunger. Also, the inner end of each sleeve 140 communicates with the combustion chamber of one of the engine cylinders through a passage 149 and a conduit 150. Fuel under pressure is supplied through a conduit 152 to the pump chamber 154 containing the plungers 136. Each plunger 136 is reciprocated in timed relation with the motion of its associated engine cylinder to pump fuel into said cylinder for each power stroke of its piston.

With this construction of the pump unit 132, when one of its plungers 136 is in its extended position relative to its sleeve 140—as the upper plunger in Figure 1—fuel from the chamber 154 fills the plunger passages 142, 144 and 146 and the inner end of the sleeve 140. Then, as the plunger moves into the sleeve 140, a point is reached at which the sleeve 138 closes the passages 146 thereby trapping fuel within the plunger and sleeve 140. Thereafter, movement of this plunger into the sleeve 140 forces fuel through its associated conduit 150 into its engine cylinder until the sleeve passage 148 uncovers the plunger passage 144. In this way, the position of each sleeve 138 determines the beginning of the pumping stroke of its associated plunger and the passage 148 in each sleeve 140 determines the end of the pumping strokes of its associated plunger. The sleeves 138 are made adjustable to adjust the capacity of the pump unit—that is, to change the quantity of fuel supplied to each engine cylinder per intake stroke. To this end, the sleeves 138 are connected to a plate 155 and the aforementioned rod 130 is secured to the plate 155 and extends from the pump unit to permit adjustment of the position of the sleeves 138. This type of fuel injection pump unit is quite conventional.

With the aforedescribed fuel cam 114 and fuel pump unit 132, the fuel cam 114 is movable to control the position of the adjustable sleeves 138 of the fuel pump unit 132 thereby controlling the quantity of fuel supplied to each engine cylinder per intake stroke. Since the fuel and manifold pressure cams move as a unit, they may be designed to provide any reasonable or practical relation between engine manifold pressure and the rate at which the engine consumes fuel. If the engine were provided with a conventional carburetor instead of the pump unit 132 for controlling the fuel flow to the engine, the fuel cam 114 would be connected to the carburetor to control its fuel-air ratio setting.

In addition to controlling the engine air and fuel intake, the power control handle 104 may also control engine speed. To this end, a fourth cam surface 160 termed the R. P. M. cam is formed rigid with the cam member 97. A bell crank lever 162 having a cam follower portion 164 at one end is urged into engagement with the cam 160 by a spring 165. The other end of the bell crank lever 162 is connected to a pinion 166 by a link 168. The pinion 166 is disposed between a pair of racks 170 and 172 and the rack 172 is operatively connected to an arm 174 of a governor 176 for controlling the speed of the engine 10. In this way, the R. P. M. cam is effective to control the speed setting of the governor 176. The R. P. M. cam 160, like the other cams, is movable axially with the piston 46 with changes in engine altitude and is contoured axially to produce a desired variation of engine speed with altitude.

The governor 176 comprises a sleeve 178 driven by the engine 10 for rotating flyweights 180 pivotally carried by the sleeve 178. The flyweights 180 tend to move radially outwardly against the compression of a spring 182 in response to the centrifugal force acting on the flyweights. Movement of the flyweights 180 controls the position of a valve 184 slidable within the sleeve 178 for controlling the admission and relief of fluid pressure in a conduit 185 communicating with the propeller pitch changing mechanism 14 thereby controlling the speed of the engine 10. The spring 182 bears against a rack 186 adjustable by a pinion 188 for regulating the speed setting of the governor 176. For a more complete description of a governor of this type, attention is directed to Patent No. 2,204,640 to E. E. Woodward.

The pinion 188 is carried by the arm 174 whereby the cam 160 is movable to control the speed of the engine 10. With the structure so far described, the rate of engine air and fuel flow and engine speed are all under the control of the single lever 104. As the aircraft goes up in altitude, the manifold pressure regulator operates to open the throttle valve 32 to maintain or provide a desired manifold pressure. When the throttle valve is fully open, it is not possible to maintain the engine manifold pressure and therefore engine power at higher altitudes—unless, for example, the speed of the engine supercharger 26—is increased. However, instead of increasing the speed of the supercharger to maintain the engine power, the speed of the engine itself may be increased to maintain its power output substantially constant above the critical altitude.

With the present invention, axial movement of the piston 46 not only shifts the cam member 97 with changes in engine altitude, but this movement of the piston also controls the speed of the engine driven supercharger 26. To this end, the piston 46 has an extension 189 splined at 190 to a sleeve 192 to which the control handle 104 is splined at 194. Accordingly, the piston 46 rotates with the control handle 104. The piston 46 is also provided with an external groove 196 which extends about the periphery of the piston through an arc corresponding to the range of rotary movement of the cam member 97 in which speed control of the supercharger 26 is desired. The piston 46 has a radial passage 198 establishing communication between the groove 196 and the interior of the piston. A suitable fluid under pressure, such as engine lubricating oil, is admitted into the interior of the piston 46, in all of its positions, from a passage 200, an annular groove 202 and passage 204.

In response to axial movement of the piston 46, the annular groove 196 is adapted to be alined with passages 206 or 208. The passages 206 and 208 respectively communicate with opposite ends of a valve bore 210 formed in a housing 212 within which a valve 214 is movable to control the speed ratio of the transmission 28. A pair of snap rings 216 and 218 within the bore 210 define the end positions of the valve 214. The valve is adapted to be releasably held in either end position by a spring-pressed detent 220 engageable with a notch 222 when the valve is in its left-hand position against the snap ring 216 and engageable with a notch 224 when the valve is in its right-hand position against the snap ring 218.

The valve 214 controls the speed ratio of the transmission 28. As illustrated in Figure 1, the valve 214 is positioned to the left against the snap ring 216 and in this position, the transmission 28 is in its low speed ratio. When the valve moves against the snap ring 218, the transmission speed ratio is increased thereby increasing the speed of the supercharger 26. The transmission may be of the type illustrated in the aforementioned Patent No. 2,101,239 to R. Chilton. This type of transmission has two clutches which are selectively engageable to provide the two transmission speed ratios. Fluid pressure transmitted through a passage 226 controls the operation of one of the transmission clutches and fluid pressure transmitted through a passage 228 controls the operation of the other transmission clutch.

With the valve 214 in its low speed ratio position, as illustrated in Figure 1, a suitable fluid under pressure is admitted from a conduit 230 to an annular groove 232 in the valve 214 and then through the passage 226 to the low speed ratio clutch of the transmission. At the same time, the transmission high speed ratio clutch is vented through the passage 228 and annular groove 234 about the valve 214 to a drain passage 236. When the piston 46 moves axially to the left to bring its groove 196 into communication with the passage 208, the fluid pressure in the piston 46 is transmitted through this passage to the left end of the valve 214. At first, this fluid pressure bleeds off through the restriction 238, annular valve groove 240 and a drain passage 242. However, when the piston groove 196 uncovers a substantial portion of the passage 208, the fluid from the piston enters this passage at a rate faster than it can escape through the restriction 238 whereupon the pressure builds up behind the left end of the valve 214. When this pressure is sufficient to overcome the resistance offered by the spring-pressed detent 220, the valve 214 snaps to the right against the snap ring 218. The detent 220 now releasably holds the valve 214 in this new position in which fluid pressure is admitted from the conduit 230 through the annular groove 232 and the passage 228 to the high speed ratio clutch of the transmission 28. At the same time, the low speed ratio clutch in the transmission is vented through the passage 226, annular valve groove 244 and a drain passage 246. Accordingly, the transmission shifts into high speed ratio.

With the supercharger in high speed, when the piston 46 moves axially to the right in Figure 1— for example, when the aircraft descends—to an extent sufficient to bring its groove 196 into communication with the passage 206, fluid pressure is transmitted from the interior of the piston 46 through the passage 206 to the right end of the valve 214. At first, this fluid pressure escapes through a restriction 250, annular valve groove 252 and a drain passage 254. When the passage 206 is uncovered sufficiently, the pressure builds up behind the right end of the valve 214 to snap the valve back to its low speed ratio position.

With the transmission 28 in its low speed ratio, when the piston groove 196 moves to the left (Figure 1) far enough to aline with the passage 208, the throttle valve 32 is fully open. Upon the resulting shift into high speed ratio, the increase in supercharger speed tends to increase the engine intake manifold pressure. Accordingly, the manifold pressure regulator operates to partly close the throttle valve 32 by movement of the piston 46 to the right. Similarly, when the transmission 28 is in high speed ratio and the piston groove 196 moves to the right to aline with the passage 206, the throttle valve 32 is only partly open. Upon the resulting shift into low speed ratio, the decrease in speed of the supercharger tends to decrease the engine intake manifold pressure. Thereupon, the manifold pressure regulator operates to substantially fully open the throttle valve 32 by movement of the piston 46 to the left. The spacing of the passages 206 and 208 must be sufficient in order that when the piston groove 196 alines with one of these passages to effect a supercharger shift, the piston movement resulting from the shift is not sufficient to aline the piston groove 196 with the other of these passages. That is, if the spacing of the passages 206 and 208 is too close, then the supercharger will hunt between its low and high speed ratios. For example, the spacing of the passages 206 and 208 may be such that the shift of the supercharger into high speed occurs at an altitude 1000 feet higher than the shift back to low speed ratio.

As a further means of preventing hunting of the supercharger speed, when fluid pressure is admitted to the left end of the valve 214 through the passage 208 to effect a shift into high, fluid pressure is simultaneously admitted through a passage 255 to a valve 256 for moving the valve to the right against a spring 258 thereby closing the passage 206. Then, even if the piston 46 should momentarily surge to the right to an extent sufficient that its passage 196 uncovers the passage 206, this latter passage is closed by the valve 256 so that fluid pressure can not be transmitted to the right end of the valve 214 to return the supercharger to its low speed ratio. However, as soon as the piston groove 196 moves away from the passage 208, then the pressure behind the valve 256 is slowly relieved through a restriction 259 whereupon the spring 258 slowly returns the valve 256 to its normal position illustrated in Figure 1. In this way, after a shift to high speed ratio is initiated by the piston groove 196 uncovering the passage 208, a return shift to low speed ratio can not take place for a time interval determined by the size of the restriction 259.

At this point, it should be noted that the particular porting of the valve 214 depends on the type of transmission to be controlled. For example, consider a transmission of the type such as illustrated in Patent No. 2,034,087 to R. Chilton in which fluid pressure is only needed to engage the high speed clutch, the low speed clutch being automatically engageable upon disengagement of the high speed clutch. With such a transmission in place of the transmission 28, the passage 226 and associated valve porting would be eliminated. Also, although the transmission 28 has been described as a two speed transmission, it seems obvious that the transmission may have any number of speed ratios all controlled by axial movement of the piston 46.

Figures 2, 4:
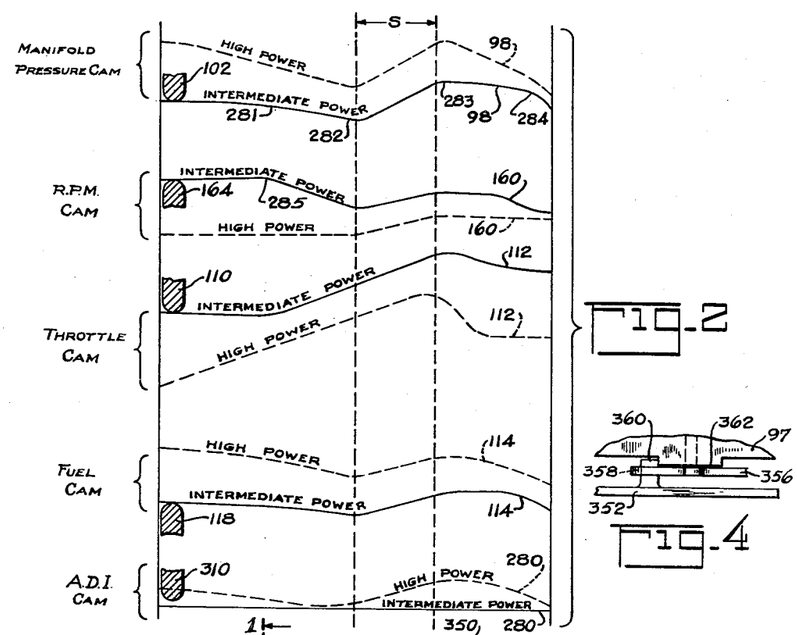
Figure 2 is a diagrammatic view disclosing the general surface of the control cams.
Figure 4 is a sectional view taken along the line 4—4 of Figure 3.

With the aircraft going up in altitude, when the supercharger shifts into high speed, the manifold pressure tends to increase, whereupon the manifold pressure regulator operates to close the engine throttle valve thereby moving the piston 46 and the cam member 97 to the right to a position they previously occupied at an altitude below the altitude at which the supercharger shift occurred. Accordingly, if the cam member 97 always follows the axial movement of the piston 46, then as the aircraft continues to go up in altitude after a shift of the supercharger into high, the cam followers will retrace a portion of their cam surfaces over which they traveled just prior to the shift. In other words, the manifold pressure, fuel flow, and engine speed variations with altitude just prior to the supercharger shift into high would be repeated at higher altitudes after the shift. The cam surfaces may be designed so that in the shift range, a compromise is made between the variations of engine speed manifold pressure and fuel flow desired at altitudes above and below the shift range. In addition, means may be provided to adjust the racks 126 and 170—for example, by the fluid pressure controlling the speed ratio of the transmission 28—thereby changing the fuel flow and engine speed upon a shift to a higher speed ratio. Preferably, however, and as best illustrated in Figure 2, the cams are each formed with two axially spaced sections hereinafter termed their low and high supercharger speed sections. When the transmission speed ratio shift occurs,—e. g. from low to high supercharger speed—the cam member 97 is shifted axially to the left to such an extent that the cam followers first engage beyond the initial portion of their high supercharger speed cam sections. Then as the control piston 46 moves to the right to partly close the throttle valve 32, the cam member 97 is moved to the right to bring the cam followers to the initial portion of the high supercharger speed cam sections. To this end, the cam member 97 is provided with a hub 260 axially movable with the sleeve 192. The piston extension 189 is slidable within the sleeve 192 and is provided with an annular radial flange 262 projecting within a counterbore portion 264 of the sleeve between shoulders 266 and 268. A spring 270 serves to urge the piston flange 262 against the shoulder 266.

When fluid pressure is admitted into the passage 228 for shifting the supercharger transmission from low to high speed, fluid pressure is simultaneously transmitted through a passage 272, annular groove 274 and a passage 276 in the sleeve 192 to the left side of the flange 262 thereby moving the sleeve 192 to the left against the spring 270 until the flange 262 abuts against the shoulder 268. In this way, the cam member 97 is moved to the left relative to the piston 46 when the supercharger shifts to high speed. The magnitude of this axial cam shift is such that although the piston 46 moves to the right (Figure 1) as a result of the shift into high speed, the cam followers now engage the right hand or high supercharger speed sections of their associated cams. When the valve 214 returns to its low supercharger speed position, the passage 272 is vented to the drain passage 236. Accordingly, the spring 270 moves the sleeve 192 and cam member 97 axially to the right relative to the piston 46 whereupon the cam followers again engage the left hand or low supercharger speed sections of their associated cams.

Figure 2 illustrates in full lines the contour of the cams 98, 112, 114 and 160 at an axial section through the cams and their cam followers corresponding to an intermediate power setting of the cam member 97. Also, Figure 2 illustrates in dotted lines the axial contour of the cams at a high power setting. As previously mentioned, the cams are divided into two axial sections—namely, a low supercharger speed section and a high supercharger speed section. The left and right ends of the cams (Figures 1 and 2) constitute, respectively, their low and high supercharger speed sections—and as illustrated in Figure 2 these sections are separated by the axial distance $s$. That is, $s$ is the net axial shift of the cams resulting from a shift of the supercharger transmission 28 and therefore includes the movement of the cam member resulting from the adjustment of the throttle valve 32 following the supercharger shift. Also illustrated in Figure 2 is a fifth cam 280 carried by the cam member 97. The cam member 280 controls the introduction of an anti-detonant into the engine 10. This cam is referred to as the A. D. I. (anti-detonant injection) cam and is hereinafter more fully described.

In Figure 2, the direction of the movement or lift of the cam followers is similar to that illustrated in Figure 1 for effecting an increase or a decrease in the factors controlled thereby. Also, in Figure 2 as in Figure 1, the cams move axially to the left with the piston 46, relative to the cam followers, in response to an increase in altitude. As illustrated in Figure 2, the cam followers engage the extreme left ends of the cams—that is, the cams are each in their extreme low altitude position.

Considering the manifold pressure cam 98, with the cam follower 102 engaging the low altitude end of the intermediate power contour of the cam 98 as illustrated in Figure 2. Then, upon an increase in altitude, the cam 98 moves axially to the left and the cam contour is such that the lift of the cam follower decreases slightly whereby the manifold pressure falls off slightly with increase in altitude. This decrease in manifold pressure with increase in altitude compensates for the reduction in engine back pressure with increase in altitude to control the engine power. Preferably, consideration is also taken of the average decrease in air temperature with increase in altitude because of the resulting increase in the mass of air taken in per engine stroke at a particular intake manifold pressure. Accordingly, the manifold pressure cam preferably is designed to reduce the manifold pressure with increase in altitude to compensate for both the average reduction in the exhaust back pressure and the average reduction in the air intake temperature.

When the cam follower 102 engages the cam 98 at the point 281, the manifold pressure regulator has fully opened the engine throttle valve 32 so that, upon any further increase in altitude, the manifold pressure will fall off because of the decreasing air density. Instead of shifting to a high supercharger speed at this point, the engine speed is increased, as hereinafter described, to maintain the engine power. As the aircraft goes up in altitude beyond that corresponding to the point 281, the cam 98 is contoured to set the manifold pressure regulator for more sharply decreasing manifold pressures as the piston 46 moves to the left with increasing altitude, thereby providing for gradual movement of the piston 46 and the cams to the left with further increase in altitude. That is, the lift of the cam follower 102 decreases at a faster rate to the right of the point 281. In the absence of this feature, upon an increase in altitude beyond that corresponding to the point 281, the piston 46 would immediately move and continue to move to the left until a shift into a higher supercharger speed was effected.

When the cam follower 102 engages the point 282 on the cam 98, the supercharger is shifted into high, as previously described, and the cam member 97 is shifted to the left the net distance $s$ thereby bringing the cam follower 102 into contact with the cam 98 at the point 283. This point 283 provides a higher lift for the cam follower 102 than that provided at sea level by the cam 98 in this particular power range thereby increasing the manifold pressure to compensate for the extra power required to drive the supercharger at its increased speed and to compensate for the increase in the temperature of the engine intake air resulting from its higher compression. As the aircraft continues to go up in altitude, the lift of the cam follower 102 decreases slightly to again compensate for the decrease in engine back pressure and air intake temperature until the cam follower engages the cam at the point 284. At this altitude, the throttle valve 32 is again fully open so that, to the right of this point, the cam 98 decreases the lift of the cam follower 102 more rapidly. That is, to the right of the point 284, the cam 98 is designed to decrease the setting of the manifold pressure regulator at a rate sufficiently fast with increase in altitude in order to provide for gradual movement of the piston 46 and the cam member 97 to the left with increase in altitude.

At this point, it should be noted that, instead of modifying the manifold pressure cam 98 to compensate for the effect on engine power of changes in exhaust back pressure and air intake temperature with altitude, the R. P. M. cam 160 could be modified to provide the desired engine power.

In the high power contour of the cam 98, indicated by the dashed lines in Figure 2, the throttle valve 32 is almost fully open at sea level. Therefore, the contour of the cam 98 is such that, as the engine goes up in altitude, the lift of the cam follower 102 first decreases slowly to compensate for the decreasing engine exhaust back pressure and air intake temperature. After the throttle valve 32 reaches its full open position and the aircraft continues to go up in altitude, the lift of the cam follower decreases more rapidly in order to decrease the manifold pressure setting fast enough with increase in altitude to provide for progressive movement of the piston 46 to the left with increase in altitude. The high supercharger speed section of the high power contour of the manifold pressure cam has a slope generally similar to the illustrated low altitude section.

The R. P. M. cam 160 in the lower power range illustrated is designed to keep the engine R. P. M.

substantially constant as the aircraft altitude increases until the cam follower 164 engages the point 285 on the cam 160. The points 281 and 285, on the cams 98 and 160, are engaged by their cam followers 102 and 164, respectively, at the same altitude and, at this altitude, the engine throttle valve 32 has been fully opened, as previously described. As the altitude increases, the R. P. M. cam increases the lift of the cam follower 164 to gradually increase the engine speed. Upon the shift into high supercharger speed, the cam 160 is designed to provide a somewhat reduced engine speed and this speed is held constant until the throttle valve 32 is again fully open. Thereafter, upon a further increase in altitude, the cam 160 again effects an increase in engine speed. In the high power range, the R. P. M. cam 160 holds the engine speed constant throughout its low altitude section and upon a shift into high supercharger speed, the cam 160 provides a lower engine speed which is held constant over the high supercharger speed section of the cam.

In the idling power range of the engine, automatic control of the propeller pitch is not practical. Accordingly, the R. P. M. cam 160 is designed so that, when the control handle 104 is set for engine idling operation, the cam 160 asks for an engine speed which is higher than the speed the engine is able to attain because the throttle valve 32 is only opened to a small extent at engine idling. Therefore, in the idling power range, the propeller pitch is adjusted to its extreme low pitch setting.

The fuel cam 114 generally follows the manifold pressure cam since the quantity of air entering each cylinder per intake stroke is proportional to the manifold pressure except for changes in volumetric efficiency of the cylinder, engine back pressure and density of the intake air.

The throttle cam 112 provides the throttle opening during engine idling operation since, as previously described, at this setting of the cam member 97, the manifold pressure regulator has no control of the position of the throttle. In all other rotative positions of the cam member 97, the throttle opening provided by the throttle cam 112 can be over-ridden by movement of the piston 46 as a result of the displacement of the servo valve 74 and sleeve 60 from their relative neutral position. The throttle cam 112 is also designed to vary the travel of the piston 46 to provide for a desired degree of sensitivity of the automatic control and to avoid steep contours on the manifold pressure cam. Thus, if the throttle cam 112 provides substantially the correct position of the throttle valve 32 for the setting of the manifold pressure regulator by the cam 98, there will only be a small movement of the piston 46 to provide the correct throttle position. However, if the position of the throttle valve 32, as determined by the throttle cam, deviates substantially from that necessary to provide the manifold pressure called for by the manifold pressure cam 98, then a substantial movement of the piston 46 will take place to provide the correct position of the throttle valve 32. The throttle cam 112 may be designed to so control the travel of the piston 46 that the shift to high supercharger speed always occurs at the same axial position of the piston 46 regardless of the power setting of the control handle 104 and, similarly, the shift to low supercharger speed always occurs at the same position of the piston 46. With this arrangement, piston groove 196 is co-planar. Obviously, the throttle cam 112 could be designed so that a supercharger shift would occur at different axial positions of the piston 46 for different power settings of the control handle 104. In this latter case, the groove 196 would be non-planar.

Figure 3:
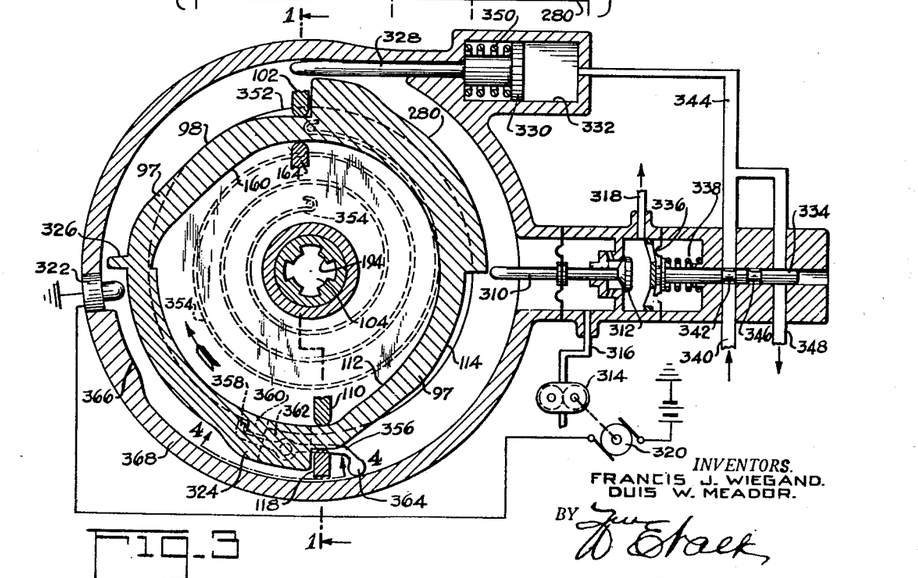
Figure 3 is a sectional view taken along the line 3—3 of Figure 1.

As illustrated in Figure 3, the cams 98, 112, 114 and 160 each subtend an arc of approximately 90° so that the control handle 104 is provided with a 90° range of movement. In the low power end of this control movement, the throttle valve 32 may not reach its full open position as the aircraft goes up in altitude so that in this range a shift to a higher supercharger speed ratio would be unnecessary and probably undesirable. This low power range in which the provision for a supercharger shift is unnecessary may, for example, correspond to approximately 30° of rotary movement of the cams. With this arrangement, the groove 196 would only need to subtend an arc of 60° to provide for a supercharger speed-ratio shift in the remaining 60° of rotary control movement of the cams. In this low power range, the axial contour of the cams is quite flat and merely compensates for changes in exhaust back pressure and air intake temperature.

The nature of the surfaces of each of the three dimensional cams depends on the desired engine operation and on the particular engine and propeller to be controlled. For example, as described, as the engine goes up in altitude, the engine speed is increased when the throttle valve 82 is fully open and at a still higher speed, the supercharger is shifted to a higher speed. However, in a particular installation it may be more efficient to shift into high supercharger speed as soon as the engine throttle valve is fully open instead of first increasing the engine speed. Also, the invention is not limited to the combination of all the cams described. For example, the fuel cam 114 may be eliminated and in its stead, the fuel could be controlled by a conventional carburetor. In general, the surface of each cam comprises a warped or three dimensional surface providing smooth change in the cam lift as the cams are moved axially and circumferentially. Thus, the surface of each cam provides a smooth transition between the high and intermediate power contours illustrated in Figure 2 and their low power contour.

As described, the manifold pressure cam is designed to at least approximately compensate for average changes in engine exhaust back pressure and changes in engine intake air temperature with altitude. In addition, as illustrated in Figure 1, in order to provide accurate compensation the passage 72 between the intake manifold 34 and the manifold pressure regulator chamber 68 may be provided with a restriction 290 and a pair of adjustable bleed passages 292 and 294. The passage 292 is adjustably controlled by a needle valve 296 connected to a suitable thermostat responsive to the temperature of the engine intake air. Thus, as illustrated, a suitable temperature responsive liquid is contained in a bulb 300 disposed in the intake manifold 34. The bulb 300 communicates with the interior of the bellows 298 carrying the valve 296 whereby any increase in temperature of the engine intake air results in expansion of the bellows 298 to increase the size of the bleed opening 292 and vice versa. As a result, the pressure in the manifold pressure regulator chamber 68 decreases with increase in temperature of the engine intake air and, therefore, the manifold pressure regulator bellows 66 operates to increase the manifold pressure as previously described. In this way, the manifold pressure increases with increase in temperature of the engine intake air and vice versa so that the mass of air taken in per intake stroke is substantially unaffected by changes in air temperature.

The second bleed opening 294 is controlled by a valve 301 movable by a bellows 302 in response to changes in the pressure of the engine exhaust in the manifold 37. If the exhaust pressure increases, the bellows 302 expands to increase the size of the bleed opening 294 thereby decreasing the pressure in the manifold pressure regulator chamber 68 whereupon the manifold pressure regulator operates to increase the manifold pressure. Similarly, a decrease in engine exhaust back pressure results in a decrease in engine intake manifold pressure. In this way, the mass of engine intake air per intake stroke is substantially unaffected by changes in engine exhaust back pressure.

The valves 296 and 301 may be contoured so as to effect a variation in engine power with changes in engine exhaust back pressure and air intake temperature instead of maintaining the power constant. For example, the valve 296 may be contoured to decrease the engine power when the intake air temperature exceeds a predetermined value.

In order to provide for an increase in the detonation free power range of an engine, it is common practice to introduce an anti-detonant, such as water, into the engine at high engine powers in order to inhibit engine detonation. As previously mentioned, a fifth three-dimensional cam 280, illustrated in Figures 2 and 3, preferably is provided for controlling the introduction of an anti-detonant into the engine. A cam follower 310 is arranged to be raised by the cam 280 to open a valve 312 and when the valve 312 is open, a pump 314 is operative to supply an anti-detonant through a passage 316 to a passage 318 communicating with the engine induction system. The pump 314 is arranged to be driven by electric motor 320 upon closure of a switch 322. The switch 322 closes upon engagement by a projection or raised portion 324 on the cam member 97.

The design of the cam 280 and projecion 324 is such that, when the engine is called upon to operate at a power condition in which the engine would normally detonate, the switch 322 is closed and the valve 312 is opened to an extent determined by the quantity of anti-detonant necessary to inhibit engine detonation. Preferably, the switch 322 closes before the anti-detonant valve 312 opens.

As illustrated in Figure 2, in an intermediate power setting of the cam member 97, the cam 280 is inoperative. In a high power range, the cam 280 operates to control the rate at which an anti-detonant is introduced into the engine. Thus, at low altitudes and at sufficiently high engine powers, the cam follower 310 is raised by the left end of the cam 280 to open the valve 312 whereupon an anti-detonant is introduced into the engine. With the cam member 97 set for high engine power, as the aircraft goes up in altitude, the decrease in air density is such that the engine can not take in sufficient air to maintain the high power. As a result, the engine power gradually decreases and, therefore, the necessary rate at which the anti-detonant must be supplied to the engine to inhibit detonation also decreases. Thus, in Figure 2, the lift of the A. D. I. cam 280, in the high power range illustrated, decreases with increase in altitude as the cam moves to the left so that the valve 312 gradually closes. However, after the shift to high supercharger speed, a larger quantity of anti-detonant is needed because of the increase in engine power and because of the increase of engine intake air temperature. Accordingly, in the high power range illustrated, the cam 280 is designed to raise the follower 310 to open the valve 312 simultaneously with or at least prior to completion of the shift to high supercharger speed.

As the aircraft continues to go up in altitude, the engine power again falls off so that the quantity of anti-detonant again can be decreased. To this end, the lift provided by the cam 280, in its high power range, falls off at its right-hand end in Figure 2. In this way, the A. D. I. cam controls the rate at which the anti-detonant is supplied to the engine both with changes in engine power and with changes in engine altitude.

If the supply of anti-detonant happens to be exhausted, it is desirable to prevent movement of the cam member 97 to a power position in which the engine would require an anti-detonant to inhibit detonation. To this end, as illustrated in Figure 3, a flange 326 extends from the cam member 97 and a plunger 328 is arranged to limit rotation of the cam member 97 should the supply of anti-detonant be or become exhausted. The plunger 328 has a piston end 330 slidable within a cylinder 332. A valve 334 is provided for controlling the fluid pressure within the cylinder 332. The valve 334 is carried by a diaphragm 336 and a spring 338 urges the valve against a stop to the position illustrated in Figure 3 in which a suitable fluid pressure is admitted from a passage 340 through an annular valve groove 342 and passage 344 to the cylinder 332. The diaphragm 336 is subjected to the pressure on the discharge side of the valve 312 whereby, when the valve 312 is opened and the pump 314 supplies an anti-detonant to the engine, the pressure of the anti-detonant acts against the diaphragm 336 to move the valve 334 against the spring 338 and align a second annular valve groove 346 with a drain passage 348 thereby venting the cylinder 332. A spring 350 is then operative to move the plunger 328 out of the path of travel of the cam flange 326.

With this construction of the anti-detonation system, if the supply of anti-detonant should be exhausted when the anti-detonant valve 312 is opened, fluid pressure from the passage 340 would hold the plunger 328 in its extended position, thereby preventing further power increasing rotation of the cam member 97.

Means are also provided for rotating the cam member 97 to a lower power if the supply of anti-detonant should become exhausted while the engine is operating at a power at which the engine would detonate if no anti-detonant were introduced into the engine. To this end, a plate 352 is secured to the sleeve 192 for rotation by the control handle 104. A spiral spring 354 is disposed between the plate 352 and the cam member 97, the opposite ends of the spring 354 being connected respectively to the plate 352 and the cam member 97. In addition, a latch 356 is pivotally mounted on the cam member 97 and is provided with a hooked end adapted to engage over one side of a projection 360 on the plate 352. The other side of the projection 360 is arranged to engage a raised boss 362 on the cam member 97. The latch 356 is urged clockwise (Figure 3) about its pivot by a spring (not shown). With this construction, upon power increasing or clockwise rotation (Figure 2) of the plate 352, this rotation is transmitted to the cam member 97 through the projection 360 and latch 356. Counterclockwise rotation of the plate 352 is transmitted to the cam member 97 through the projection 360 and the raised portion 362 on the cam member. The latch 356 is also provided with an end portion 364 adapted to cooperate with a cam portion 366 on the housing structure 368 to release the latch 356. The arrangement is such that, upon rotation of the control handle 104 in a power increasing direction, if the supply of anti-detonant is exhausted, the latch 356 is released by the cam portion 366 before the flange 326 engages the plunger 328. After the plunger 328 engages the flange 326 to prevent power increasing rotation of the cam member 97, further rotation of the control handle 104 in a power increasing direction only stresses the spiral spring 354.

If a supply of anti-detonant is available as the handle 104 is rotated in a power increasing direction, (clockwise in Figure 3) a point is reached where the cam 366 releases the latch 356. Thereafter upon further power increasing rotation of the control handle 104, this rotation is transmitted to the cam member 97 through the spiral spring 354. If the supply of anti-detonant happens to be exhausted, the plunger 328 will prevent rotation of the cam member 97 to a higher power range, the spiral spring merely winding up during further power increasing movement of the control handle 104. If the supply of anti-detonant becomes exhausted during engine operation at a high power range requiring an anti-detonant, the valve 334 operates to admit fluid pressure behind the plunger 332, whereupon the plunger operates against the spiral spring 354 to rotate the cam member 97 counterclockwise to a lower power position.

With the provision of the latch 356, the spring 354 only functions when needed, that is at power settings above the normal detonation free power range of the engine. If desired, the spring 354 could be the sole means for transferring motion from the control handle 104 to the cam member 97. However, with the addition of the latch 356, the spring 354 is relieved of load except when the operation of the spring is necessary. Thus, the latch 356 provides for positive movement of the cam member 97 by the control handle 104 during the normal detonation free power range of the engine and it is only when the control handle 104 is moved beyond this range into a higher power range where an anti-detonant is required, that the spring 354 becomes operative.

When the engine is being supplied with an anti-detonant, it is possible to decrease the fuel-air ratio of the combustion mixture without causing the engine to detonate. Accordingly, the fuel cam 114 may be contoured so that in the power and altitude ranges in which an anti-detonant is supplied to the engine, the quantity of fuel delivered to each engine cylinder per intake stroke is reduced. If the system is not provided with a fuel cam, the fuel-air ratio of the combustion mixture supplied to the engine may be decreased by providing means responsive to the pressure of the anti-detonant in the conduit 318 for this purpose. Thus, when anti-detonant is supplied to the engine through conduit 318, its pressure or the valve 334 controlled thereby could decrease the capacity setting of the pump unit 132. In the case of an engine provided with a carburetor, the pressure of the anti-detonant or the valve 334 could be arranged to adjust the carburetor so as to reduce the fuel-air ratio.

In the case of military aircraft, the various cam surfaces of the cam member 97 are designed for combat operation. For aircraft cruising, it is preferable to operate at a higher manifold pressure than that provided by the cam surface 98 in its power range corresponding to engine cruising. To this end, there is provided a lever 370 which is adapted to be rotated counterclockwise (Figure 1) to move the valve 74 to the right against the spring 70, thereby lifting the cam follower 102 off the manifold pressure cam 98. Movement of the valve 74 to the right unbalances the manifold pressure regulator to open the engine throttle valve 32 to increase the engine manifold pressure. Preferably, the lever 370 is also connected to the rack 126 so that counterclockwise rotation of the lever 370 not only increases the engine manifold pressure but also moves the rack 126 to the left to effect a proportionate increase in the rate of fuel flow to the engine. In this way, by means of the lever 370, the operator can raise the engine power above that called for by the cam member 97. It is also desirable to provide means to insure a high engine speed for aircraft landing and take-off operations. For this purpose, the rack 170 may be moved to the right from its normal position to increase the engine speed above that which might otherwise be called for by the R. P. M. cam 160.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A control system for an engine, said system comprising a valve for controlling the engine intake air, a member movable to vary the position of said valve, regulating means automatically responsive to changes in the engine intake air pressure for moving said member to maintain a predetermined engine intake air pressure, a three dimensional cam movable to set the pressure maintained by said regulating means, means connecting said member to said cam for moving said cam along one path in response to movements of said member, and manually operable means for moving said cam along another path.

2. A control system for an engine, said system comprising a valve for controlling the engine intake air, a member movable to vary the position of said valve, regulating means automatically responsive to changes in the engine intake air pressure for moving said member to maintain a predetermined engine intake air pressure, a first three dimensional cam movable to set the pressure maintained by said regulating means, a second three dimensional cam movable to vary the position of said valve independently of said member, said member being connected to said cams for moving each of said cams along a first path in response to movements of said member, and manually operable means for moving each of said cams along a second path.

3. A control system for an engine having a variable speed supercharger for the engine induction system, said system comprising a valve for controlling the engine intake air, a member movable to vary the position of said valve, means responsive to movements of said member for controlling the speed of said supercharger relative to that of said engine, regulating means automatically responsive to changes in the engine intake air pressure for moving said member to maintain a predetermined engine intake air pressure, a cam movable to determine the pressure maintained by said regulating means, means operatively connecting said member to said cam for moving said cam along one path in response to movements of said member, means for moving said cam along a second path, said cam being designed to change the intake air pressure maintained by said regulator upon an increase in the speed of said supercharger relative to that of said engine.

4. A control system for an engine having a variable speed supercharger for the engine induction system, said system comprising a valve for controlling the engine intake air, a member movable to vary the position of said valve, said member being movable to effect an increase in the speed of said supercharger relative to that of said engine upon movement of said member in one direction beyond a predetermined position and to effect a decrease in said relative supercharger speed upon reverse movement of said member past said first predetermined position to a second predetermined position, regulating means automatically responsive to changes in the engine intake air pressure for moving said member to maintain a predetermined engine intake air pressure, a cam movable to determine the pressure maintained by said regulating means, means operatively connecting said member to said cam for moving said cam along one path in response to movements of said member, and means for moving said cam along another path.

5. A control system for an engine having a variable speed supercharger for the engine induction system, said system comprising a valve for controlling the engine intake air, a member movable to vary the position of said valve, means responsive to movements of said member for controlling the speed of said supercharger relative to that of said engine, regulating means automatically responsive to changes in the engine intake air pressure for moving said member to maintain a predetermined engine intake air pressure, a three dimensional cam movable to determine the pressure maintain by said regulating means, means connecting said member to said cam for moving said cam along one path in response to movements of said member, and manually operable means for moving said cam along another path.

6. A control system for an engine having a variable speed supercharger for the engine induction system comprising a valve for controlling the engine intake air, a member movable along one path to vary the position of said valve, regulating means automatically responsive to changes in the engine intake air pressure for moving said member to maintain a predetermined intake air pressure, a three dimensional cam movable to determine the pressure maintained by said regulating means, means operatively connecting said member to said cam for moving said cam along one path in response to movements of said member, manually operable means for moving said cam and member along second paths, and means responsive to movements of said member for controlling the speed of said supercharger relative to that of said engine.

7. A control system for an engine having a variable speed supercharger for the engine induction system, said system comprising a valve for controlling the engine intake air, a member movable to vary the position of said valve, regulating means automatically responsive to changes in the engine intake air pressure for moving said member to maintain a predetermined engine intake air pressure, a cam movable to determine the pressure maintained by said regulating means, means connecting said member to said cam for moving said cam along a first path, means responsive to a predetermined movement of said member in one direction for increasing the speed of said supercharger relative to that of said engine, means operable substantially simultaneously with said speed increase for shifting said cam relative to said member, and manual means for moving said cam along a second path.

8. A control system for an engine having a variable speed supercharger for the engine induction system, said system comprising a valve for controlling the engine intake air, regulating means automatically operable to maintain a predetermined engine intake air pressure, a cam having two spaced cam portions, a cam follower movable by said cam portions to determine the pressure maintained by said regulating means, means operable for changing the speed of said supercharger relative to that of said engine, and means operable substantially simultaneously with operation of said speed changing means for effecting disengagement of said cam follower with one of said cam portions and engagement with the other of said cam portions.

9. A control system for an engine having a variable speed supercharger for the engine induction system, means automatically operable for increasing the speed of said supercharger relative to that of said engine, and means operative upon said relative speed increase to prevent a decrease of said relative speed for a predetermined time interval thereafter.

10. A control system for an engine having a variable speed supercharger for the engine induction system, said system comprising a valve for controlling the engine intake air, means operable when said valve is substantially fully open for increasing the speed of said supercharger relative to that of said engine, and means operative upon said relative speed increase to prevent a decrease of said relative speed for a predetermined time interval after said speed increase.

11. A control system for an engine having a variable speed supercharger for the engine induction system, said system comprising a valve for controlling the engine intake air, means responsive to the changes in the pressure of the engine intake air for regulating the position of said valve, means operable when said valve is substantially fully open for increasing the speed of said supercharger relative to that of said engine, and means operative upon said relative speed increase to prevent a decrease of said relative speed for a predetermined time interval after said speed increase.

12. A control system for an engine having a variable speed supercharger for the engine induction system, said system comprising a valve for controlling the engine intake air, a member movable to vary the position of said valve, said member being movable to effect an increase in the speed of said supercharger relative to that of said engine, and means operative upon said speed increase to prevent a decrease of said relative speed for a predetermined time interval after said speed increase, regulating means automatically responsive to changes in the engine intake air pressure for moving said member to maintain a predetermined engine intake air pressure, a cam movable to determine the pressure maintained by said regulating means, and means operatively connecting said member to said cam for moving said cam in response to movements of said member.

13. A control system for an internal combustion engine, said system comprising regulating means operable to maintain a predetermined engine intake manifold pressure, a pair of three dimensional cams, one of said cams being movable to determine the pressure maintained by said regulating means, the other of said cams being movable to vary the rate at which fuel is supplied to said engine, means for automatically moving said cams along first paths with changes in engine altitude, and manual means for moving said cams along second paths.

14. A control system for a multi-cylinder engine having a positive displacement engine driven fuel pump for each engine cylinder, said system comprising regulating means operable to maintain a predetermined engine intake manifold pressure, a pair of cams, one of said cams being movable to determine the pressure maintained by said regulating means, the other of said cams being movable to vary the discharge capacity of said pumps, said cams comprising three dimensional cams, means for automatically moving said cams along first paths with changes in engine altitude, and manual means for moving said cams along second paths.

15. A control system for an engine, said system comprising a first three dimensional cam movable to adjust the engine intake manifold pressure, a second three dimensional cam movable to vary the quantity of fuel supplied to the engine per intake stroke, a third three dimensional cam movable to vary the speed of said engine, a fourth three dimensional cam movable to vary the rate at which an anti-detonant is supplied to said engine, means for moving each of said cams along a first path in response to changes in engine altitude, and manually operable means for moving each of said cams along a second path.

16. A control system for an engine, said system comprising a valve for controlling the engine intake air, a member movable to vary the position of said valve, regulating means automatically responsive to changes in the engine intake air pressure for moving said member to maintain a predetermined engine air intake pressure, a first three dimensional cam movable to determine the pressure maintained by said regulating means, a second three dimensional cam movable to vary the position of said valve directly therefrom, a third three dimensional cam movable to vary the speed of said engine, and manually operable means for moving said cams along first paths, said cams all being connected to said member for moving said cams along second paths in response to movement of said member.

17. A control system for an engine, said system comprising a valve for controlling the engine intake air, a member movable to vary the position of said valve, regulating means automatically responsive to changes in the engine intake air pressure for moving said member to maintain a predetermined engine air intake pressure, a first three dimensional cam movable to determine the pressure maintained by said regulating means, a second three dimensional cam movable to vary the position of said valve directly therefrom, a third three dimensional cam movable to vary the speed of said engine, a fourth three dimensional cam movable to vary the quantity of fuel consumed by the engine per engine intake stroke, and manually operable means for moving said cams along first paths, said cams all being connected to said member for moving said cams along second paths in response to movement of said member.

18. A control system for an engine, said system comprising a valve for controlling the engine intake air, a member movable to vary the position of said valve, regulating means automatically responsive to changes in the engine intake air pressure for moving said member to maintain a predetermined engine air intake pressure, a first three dimensional cam movable to determine the pressure maintained by said regulating means, a second three dimensional cam movable to vary the position of said valve directly therefrom, a third three dimensional cam movable to vary the speed of said engine, a fourth three dimensional cam movable to vary the quantity of fuel consumed by the engine per engine intake stroke, a fifth three dimensional cam movable to vary the rate at which an anti-detonant is introduced into said engine, and manually operable means for moving said cams along first paths, said cams all being connected to said member for moving said cams along second paths in response to movement of said member.

19. A control system for an aircraft engine, said system comprising first means movable to determine the engine power output, second means movable to control the rate at which an anti-detonant is introduced into said engine, and third means for controlling the operation of said second means with changes in the position of said first means and with changes in engine altitude.

20. A control system for an aircraft engine, said system comprising means operable to control the rate at which an anti-detonant is introduced into said engine, a three dimensional cam movable to control the operation of said means, means for moving said cam along one path with changes in engine altitude, and means movable for determining the engine power output and for moving said cam along another path.

21. A control system for an engine, said system comprising a valve for controlling the engine intake air, a member movable to vary the position of said valve, regulating means automatically responsive to changes in the engine intake air pressure for moving said member, a first three dimensional cam movable to determine the pressure maintained by said regulating means, means connecting said member to said cam for moving said cam along one path in response to movements of said member, manually operable means for moving said cam along another path, and a second three dimensional cam movable with said first cam for controlling the rate at which an anti-detonant is introduced into said engine.

22. A control system for an engine; said system comprising a first member movable to vary the power output of said engine; yieldable means having its one end connected to said first member; a manually operable member connected to the other end of said yieldable means whereby said manually operable member is operatively connected to said first member through said yieldable means for setting the power output of the engine; means for supplying an anti-detonant to said engine; and means automatically operative when the supply of anti-detonant is exhausted for preventing movement of said first member in a power increasing direction beyond a predetermined position of said member.

23. A control system for an engine; said system comprising a first member movable to vary the power output of said engine; yieldable means having its one end connected to said first member; a manually operable member connected to the other end of said yieldable means whereby said manually operable member is operatively connected to said first member through said yieldable means for setting the power output of said engine; means for delivering an anti-detonant to said engine at relatively high power settings of said first member; and means automatically operative, when the supply of anti-detonant becomes exhausted during its delivery to said engine, for moving said first member to a lower power setting against said yieldable means.

24. A control system for an engine; said system comprising a first member movable to vary the power output of said engine; yieldable means having its one end connected to said first member; a manually operable member connected to the other end of said yieldable means whereby said manually operable member is operatively connected to said first member through said yieldable means for setting the power output of said engine; and means automatically operative upon the occurrence of a predetermined condition adversely affecting engine performance, at relatively high power settings of said first member, for moving said first member to a lower power setting against said yieldable means.

25. A control system for an engine; said system comprising regulating means automatically operable to maintain a condition indicative of engine torque at a predetermined value, said regulating means including means adjustable to determine the magnitude of said predetermined value; a three dimensional cam movable for positioning said adjustable means; manually operable means for moving said cam along one path; and means for moving said cam along another path.

26. A control system for an engine having a member movable to vary the power output of said engine; said system comprising regulating means operatively connected to said member and automatically operable to move said member to maintain a predetermined engine power output, said regulating means including means adjustable to determine the magnitude of power output maintained by said regulating means; a three dimensional cam movable for positioning said adjustable means; manually operable means for moving said cam along one path; and means for moving said cam along another path.

27. A control system for an engine; said system comprising first regulating means automatically operable to maintain a condition indicative of engine torque at a predetermined value, said regulating means including means adjustable to set the magnitude of said predetermined value of condition; second regulating means automatically operable to maintain the speed of said engine at a predetermined value, said second regulating means including means adjustable to set the magnitude of said predetermined value of speed; a three dimensional cam means movable for positioning both said adjustable means; manually operable means for moving said cam means along one path; and means for moving said cam means along another path.

FRANCIS J. WIEGAND.
DUIS W. MEADOR.

REFERENCES CITED

The following references are of record in the file of this patent:

UNITED STATES PATENTS

| Number | Name | Date |
|---|---|---|
| 2,031,527 | Dodson | Feb. 18, 1936 |
| 2,217,364 | Halford | Oct. 8, 1940 |
| 2,228,239 | Ammann | Jan. 14, 1941 |
| 2,274,693 | Heinrich, et al. | Mar. 3, 1942 |
| 2,281,411 | Campbell | Apr. 28, 1942 |
| 2,378,036 | Reggio | June 12, 1945 |
| 2,384,282 | Chandler | Sept. 4, 1945 |
| 2,388,669 | Baker | Nov. 13, 1945 |
| 2,392,565 | Anderson | Jan. 8, 1946 |
| 2,396,618 | Steiglitz | Mar. 12, 1946 |
| 2,397,984 | Schorn | Apr. 9, 1946 |
| 2,453,654 | Wheeler | Nov. 9, 1948 |